(12) United States Patent
Varatharaajan et al.

(10) Patent No.: US 12,199,717 B2
(45) Date of Patent: Jan. 14, 2025

(54) METHODS AND APPARATUSES FOR PROVIDING ANTENNA PORT RELATED INFORMATION IN A COMMUNICATIONS NETWORK

(71) Applicant: Fraunhofer-Gesellschaft zur Förderung der angewandten Forschung e.V., Munich (DE)

(72) Inventors: Sutharshun Varatharaajan, Erlangen (DE); Marcus Grossmann, Erlangen (DE)

(73) Assignee: Fraunhofer-Gesellschaft zur Förderung der angewandten Forschung e. V (DE)

( * ) Notice: Subject to any disclaimer, the term of this patent is extended or adjusted under 35 U.S.C. 154(b) by 780 days.

(21) Appl. No.: 17/288,338

(22) PCT Filed: Oct. 7, 2019

(86) PCT No.: PCT/EP2019/077011
§ 371 (c)(1),
(2) Date: Apr. 23, 2021

(87) PCT Pub. No.: WO2020/083628
PCT Pub. Date: Apr. 30, 2020

(65) Prior Publication Data
US 2021/0384955 A1    Dec. 9, 2021

(30) Foreign Application Priority Data
Oct. 26, 2018  (EP) ...................................... 18202952

(51) Int. Cl.
*H04B 7/06* (2006.01)
*H04L 5/00* (2006.01)

(52) U.S. Cl.
CPC ....... *H04B 7/0626* (2013.01); *H04B 7/06966* (2023.05); *H04L 5/0048* (2013.01)

(58) Field of Classification Search
CPC .... H04B 7/0626; H04B 7/0695–06968; H04B 7/088; H04L 5/0048–0051
See application file for complete search history.

(56) References Cited

U.S. PATENT DOCUMENTS

| | | | |
|---|---|---|---|
| 11,706,001 B2 * | 7/2023 | Zhu | H04B 7/0617 370/329 |
| 2018/0227094 A1 | 8/2018 | Liu et al. | |
| 2019/0109679 A1 * | 4/2019 | Liu | H04B 7/0404 |

FOREIGN PATENT DOCUMENTS

| | | | |
|---|---|---|---|
| WO | WO 2017/067138 A1 | 4/2017 | |
| WO | WO-2018082668 A1 * | 5/2018 | ........ H04W 56/0015 |

OTHER PUBLICATIONS

Li et al., "Wireless Communications Method and Apparatus," Eng. Translation of WO-2018082668-A1, Clarivate, pp. 1-19 (Year: 2024).*

(Continued)

*Primary Examiner* — Thomas R Cairns
(74) *Attorney, Agent, or Firm* — Burr & Forman LLP

(57) ABSTRACT

Example methods are provided that may be performed by a radio base station; or a user equipment (UE). An example apparatus is also described in the form of a UE for providing antenna port-related information to a radio base station in a communications network. A method performed by the UE may include receiving at least one DownLink (DL) beam from the radio base station, and reporting at least one Sounding Reference Signal (SRS) resource identification information for the at least one received DL beam. The SRS resource identification information may be associated with at least one antenna port of the UE receiving the corresponding DL beam.

18 Claims, 8 Drawing Sheets

(56) References Cited

OTHER PUBLICATIONS

Notification of Transmittal of The International Search Report and the Written Opinion of the International Searching Authority, or the Declaration, received from the International Searching Authority of the European Patent Office, dated Dec. 3, 2019. Preliminary Examining Authority of the European Patent Office.
Vol. RAN WG1, No. Chengdu, China; Oct. 8, 2018-Oct. 12, 2018, Sep. 29, 2018, XP051518196, retrieved from the Internet: URL: http://www.3gpp.org/ftp/tsg%5Fran/WG1%5FRL1/TSGR1%5F94b/Docs/R1%2D1810791%2Ezip [retrieved on Sep. 29, 2018] cited in the application Section 3: "UL panel specific beam selection".

* cited by examiner

METHODS AND APPARATUSES FOR PROVIDING ANTENNA PORT RELATED INFORMATION IN A COMMUNICATIONS NETWORK

CROSS-REFERENCE TO RELATED APPLICATION

This application is a national stage application, filed under 35 U.S.C. § 371, of International Patent Application No. PCT/EP2019/077011 filed on Oct. 7, 2019 and European Patent Application 18202952.0, filed on Oct. 26, 2018, which are incorporated by reference herein in their entirety.

TECHNICAL FIELD

The present disclosure relates to the field of wireless communications and in particular, to methods and apparatuses for providing antenna port-related information of a User Equipment (UE) to a radio base station in a communications network.

BACKGROUND

Beamforming is a crucial part of the Third Generation Partnership Project (3GPP) Release (Rel.) 15 which define a New Radio (NR) access technology that enables a radio base station (also denote herein gNB) and a User Equipment (UE) to establish and adapt communication links using precoded pilot signals, i.e., spatially selective transmissions. The beam management framework is discussed in parts below, for the DownLink (DL) and the UpLink (UL), followed by a description on the issues or drawbacks to be addressed.

DL Beam Reporting

The beam management framework in the DL in the current Release-15 3GPP-NR specification [1], for beam establishment and adaptation, may be explained as follows:

a. The radio base station or the gNB configures the UE with a Channel-State-Information (CSI) resource setting denoted CSI-ResourceConfig via higher layer (Radio Resource Control layer—RRC) signaling containing a configuration of a number of CSI-Reference Signals (CSI-RS) resource sets and/or Synchronization Signal/Physical Broadcast Channel (SS/PBCH) block sets. Each configured CSI-RS resource set may contain one or more CSI-RS resources, where each CSI-RS resource contains one or more CSI-RS. The DL reference signals (CSI-RS and/or SS/PBCH block) contained in a single RS resource may be transmitted using a beamforming operation to achieve certain spatial coverage. Each DL RS resource in a CSI-RS resource set may therefore be associated with a DL transmission beam. The DL transmission beams may be transmitted by the gNB in different spatial directions, this means, the first DL Transmit (Tx) beam is transmitted in a first direction, the second DL Tx beam is transmitted in a second direction, and so on. FIG. 1 illustrates such an example involving a radio base station or gNB and two UEs UE1 and UE2. The TX beams are shown as well. Link establishment and adaptation between a UE and a gNB may be performed using beamformed reference signals (RSs).

Moreover, the DL transmission (Tx) beams may be time division multiplexed in different symbol periods or slots of a subframe. For example, the first beam is transmitted in a first symbol period, the second DL beam is transmitted in a second symbol period, and so on.

b. The gNB also configures one or several higher-layer reporting settings CSI-ReportConfig [2] that provide instructions to the UE on how to report the CSI and what to report in the CSI. In case of DL beam management, the UE is configured to report either of the following quantities using the RRC parameter reportQuantity: CRI-RSRP (CSI-RS Resource Indicator-Reference Signal Received Power) or SSBRI-RSRP (SSB Resource-Indicator-RSRP).

c. The UE is configured to perform measurements on the received downlink beamformed RS and may identify a plurality of DL reception beam(s). Each DL reception beam is associated with a corresponding DL transmission beam. For each DL reception beam, the UE may use a specific setting of its Rx beamformer (the so-called Rx spatial filter). The UE may provide a beam report using the Uplink Control Information (UCI) containing the values of received beam-IDs (IDentifications or IDentities) with the received signal strengths (in terms of RSRPs):

1) A CSI-RS Resource Indicator/Index (CRI) or SSB Resource indicator/index (SSBRI), each index corresponds to a CSI-RS or SS/PBCH block resource of the transmitted DL beams.
2) Reference Signal Received Power (RSRP) associated with a particular CRI or SSBRI. It denotes the received power of the corresponding reference signal on one or more UE panels.

d. The number of pairs of CRI/SSBRI and RSRP values to be reported by the UE is configured by the gNB in the RRC parameter nrOfReportedRS.

1) In 3GPP Rel-15, there are two types of beam reporting schemes:
   (a) group-based beam reporting and (b) non-group-based beam reporting.
   i. In group-based beam reporting, the UE reports CRI/SSBRI values that can be received simultaneously by the UE either with a single spatial domain receive filter or with multiple simultaneous spatial domain receive filters.
   ii. In non-group-based beam reporting, the UE reports a total of nrOfReportedRS (CRI/SSBRI, RSRP) pairs without taking into account if the CSI-RS/SSB resources reported can be received simultaneously or not.

UL Beam Indication and Channel Sounding

To understand the UL beam management framework, we look at the UL reference signal for channel sounding, the Sounding Reference Signal (SRS), in general.

The gNB configures the UE with one or more SRS resource sets for UL channel sounding. The configuration of SRS resource set(s) is provided by the RRC parameter SRS-Config [2], which indicates groups of SRS resources in various resource sets, the time and frequency domain properties of each resource, antenna ports to be used for transmission, SRS usage type, power control parameters, spatial Tx filter settings and so on.

Each SRS resource set may be configured with the higher-layer parameter usage that takes one of the following values: beamManagement, codebook, non-CodeBook, antennaSwitching.

At most 1 SRS resource set can be configured when the parameter usage in SRS-Config is set to codebook or nonCodebook. However, more than 1 SRS resource sets can be configured if the parameter usage is set to beamManagement.

Each SRS resource set may be additionally SRS-resource-wise configured with one of the following parameters:

spatialRelationInfo: The higher-layer parameter spatialRelationInfo can be considered as a one-to-one relationship between an SRS resource and a CSI-RS or SSB reference signal, or another SRS resource. This means that the SRS (Tx beam) in the UL is transmitted with the same spatial filter used to receive the related DL beam (or in one case of spatialRelationInfo, the same spatial filter used to transmit the related SRS).

associatedCSI-RS: The higher-layer parameter associatedCSI-RS associates an SRS resource with a CSI-RS resource. This means that the SRS transmission in the UL may be precoded, where the precoder calculation is based on DL measurements of the reference CSI-RS resource.

One of the following ways can be followed to determine the UL transmission beam:

Codebook-based SRS transmissions: The UE transmits an SRS resource set and receives an SRS Resource Index or indicator (SRI) value from the gNB in the downlink. The SRI selects a single SRS resource from the configured SRS resource set. The UE also receives a TPMI (Transmission Precoder Matrix Index) that determines the precoder for the selected SRS resource from a codebook table.

Non-codebook-based SRS transmissions: One SRS resource set is transmitted for UL channel sounding and the UE receives an SRI value from the gNB in the downlink that selects one or more SRS resources from the SRS resource set. The gNB configures the higher-layer parameter spatialRelationInfo or associatedCSI-RS in the downlink in SRS-Config to determine the precoder for the indicated SRS resource(s).

SRS transmissions with usage teamManagement or 'antennaSwitching': The gNB configures the higher-layer parameter spatialRelationInfo in the downlink in SRS-Config to determine the precoder or spatial filter for each SRS resource transmitted in the UL. If no spatialRelationInfo is configured for a specific SRS resource, the precoder or the spatial filter to be used for that resource is up to UE implementation.

In the case of beam management, the UL transmission might happen as follows:

The downlink channel is sounded by the gNB for link adaptation by DL beams (CSI-RS or SSB) and the UE provides a beam report on the received DL beams in the uplink control information as configured in the higher-layer parameter CSI-ReportConfig.

For the uplink transmission of the SRS, the gNB configures SRS resources and SRS resource sets to be transmitted via the higher-layer parameter SRS-Config (the higher-layer parameter usage is set to teamManagement). The SRS resources to be transmitted may be configured with the higher-layer parameter spatialRelation Info that instructs the UE to reuse the spatial Rx filter used for the reception of a DL beam or the transmission of a UL beam for the transmission of the SRS resources. The parameter spatialRelationInfo in SRS-Config is thus used to control the precoder or spatial filter used to transmit the configured SRS resources. Note that if spatialRelationInfo is not configured, the spatial Tx filter used for transmission of the SRS resources is up to UE implementation.

The configured SRS resource sets are triggered by the parameter 'SRS request' in the Downlink Control Information (DCI) or an activation command in the Medium Access Control (MAC) layer's Control Element (CE).

The gNB may carry out multiple instances of SRS sounding to determine the appropriate UL beam to be transmitted. In each instance, the SRS to be transmitted is configured using the higher-layer parameter SRS-Config. The Physical Uplink Shared Channel (PUSCH) that carries the payload in the uplink uses the same spatial filter as the SRS in the UL.

At mmWave frequency operation, a UE may be equipped with a plurality of antenna arrays (a.k.a array panels) used for signal transmission and signal reception, see FIG. 1. The UE panels typically transmit with high directivity and can point the transmission in different spatial directions. Each array panel may be equipped with a plurality of antenna elements with one or more RF transmitter/receiver chains for signal transmission and reception.

In a typical setting, the UE may use multiple panels for receiving the DL transmission beams (using Rx diversity combining) sent by the gNB. Due to the high panel directivity, the path gains of the channels associated with the different panels may be quite different in typical mmWave channel environments and therefore, the signal power of a received DL beam may vary significantly over the panels. For an associated UL beam transmission, simultaneous multi-panel transmission at the UE may therefore not provide a significant performance gain (e.g., in terms of throughput) compared to single-panel-based transmission (since a significant portion of the total transmit power is spent for panels associated with low channel path gains). In typical settings, the UE may therefore use multiple panels or antenna ports (1, 2, 3 and 4) for receiving a DL transmission beam, and only a single panel or antenna port for a corresponding UL Tx beam transmission (see FIGS. 2(*a*) and (*b*)), wherein 2(*a*) depicts reception of a DL Tx beam sent by the gNB using two panels (or antenna ports) 1, 2 at the UE and 2 (*b*) depicts the corresponding UL transmission on the strong path component using a single panel or port 2 at the UE. FIG. 2 is self-explanatory.

In current Rel-15 beam/CSI reporting, the UE does not provide any information on DL beam reception with respect to the UE panels/ports that may help the gNB in making UL scheduling decisions, i.e., which panel(s)/ports the UL channel sounding or PUCCH/PUSCH transmissions shall be scheduled. The information about the panel/port(s) configuration at the UE is maintained transparent from the gNB. This lack of information may give rise to the following issues at the gNB:

1) In 3GPP Release 15 specifications, the network has full control over UL transmissions. The usage of multiple panels at the UE for transmission and reception increases the power consumption at the UE. Since array panel configuration at the UE is transparent to the gNB, the gNB may not be able to optimally configure UL transmissions that conserve power at the UE.

2) Latency issues of the UL link establishment and adaptation. FIG. 3 illustrates a problem that might arise while performing UL beam sweeping without panel/port-information. As shown, the UE has 4 panels or ports (1, 2, 3 and 4) and the SRS sounding is transmitted from all ports. The CSI-RS having the highest channel quality characteristic is shown received by the UE on port 2 or panel 2. An example of a channel quality characteristic includes, RSPR, SNR (Signal to Noise Ratio), SINR (Signal to Interference Noise Ratio), BER (Block Error Rate), throughput, or any suitable characteristic of the channel. Note that the lowest BER or BLER applies if the channel quality characteristic is BER or BLER. Note also that a UE may include any number of ports/panels and 4 panels (1, 2, 3, and 4) in FIG. 2 is just an example. Consider the following sequence of events:

- The UE is configured with CSI-RS resources for DL beam reporting by the higher-layer parameter CSI-ResourceConfig.
- The UE forms Rx beams using either a single or multiple panels/ports to receive the DL beams transmitted by the gNB. As shown in FIG. 2, the UE receives the DL beam (CSI-RS resource) on a single panel/port (panel/port 2). The UE reports the CRI associated with the CSI-RS resource and the associated received signal strength.
- The gNB configures SRS resources to sound the UL channel. Without any information on which panel(s) receive the DL beams with the best channel quality metrics, the gNB tries to determine the best UL transmit beam by triggering the transmission of SRS resource sets from multiple panels. The higher-layer parameter spatialRelationInfo for the transmitted SRS resources may be configured based on the reported CSI-RS/SSB resources in the DL beam report. Multiple instances of UL sounding might have to be performed before determining the suitable SRS resource (i.e., beam) in the uplink. If the gNB had some information on the reception of the DL beams at the UE, it may choose to reduce the number of panels from which it sounds the UL channel, thereby reducing the amount of UL resources used for channel sounding and the latency in link establishment/adaptation in the UL.

There are solutions known in the art for providing information on active/receiving antenna ports or panels to a gNB.

In the RAN1#94-bis of 3GPP, a popular solution proposed by some companies is to introduce explicit UE panel-specific IDs [3, R1-1811408] [4, R1-1810221], [5, R1-1810791] to indicate the selected panel(s)/ports in beam reporting. As such, the gNB can know the UE panel index/indices for measurement of the corresponding SSB/CSI-RS. For example, [5, R1-1810791] proposes "Proposal 5: For UL panel specific beam selection, it should be supported that UE can report antenna port(s) group index for each downlink reference signal resource." Here, an antenna port(s) group ID can be understood as a panel ID. An explicit signaling of panel IDs as proposed by [4, R1-1810221], [5, R1-1810791] in a beam report would mean that the UE shares information about its particular panel configuration/implementation with the gNB.

A problem with such a solution is that it violates UE privacy. With the specification of panel-specific IDs, the gNB is aware of the panel-mapping at the UE, i.e., the gNB has the knowledge about the antenna port(s) in the UE the SRS resources are mapped to. Moreover, an explicit signaling of UE panel/port-specific IDs increases the feedback overhead in beam reporting.

SUMMARY

In view of the drawbacks/issues disclosed earlier, the inventors propose in the following an extension of the 3GPP Rel-15 beam reporting scheme that facilities gNB-based UL beam/panel/port selection at the UE without explicit signaling of UE panel/port IDs. To deal with these issues, the inventors propose two solutions to aid the gNB in aligning the panels for signal reception and transmission at the UE.

It is thus an object of embodiments herein to provide methods and apparatuses for providing antenna panel/port-related information of a UE to a radio base station or gNB in a communications network. The presented solutions achieve at least the following technical effects: reduction of UL link adaptation latency; providing information to the network to optimally control UE's power consumption and facilitating configuration of the SRS resource(s) or SRS resource set(s) for UL transmission.

According to an aspect of embodiments herein, there is provided a method performed by a UE for providing antenna port related information to a radio base station (or gNB), about signal reception at the UE, the method comprising: receiving at least one DL beam from the radio base station; and reporting at least one SRS resource identification information for said at least one received DL beam, wherein the SRS resource identification information is associated with at least one antenna port of the UE receiving the corresponding DL beam.

According to another aspect of embodiments herein, there is provided a method performed by a radio base station for acquiring antenna-port related information of a UE about signal reception at the UE, the method comprising: transmitting at least one DL beam to the UE; and receiving, from the UE, at least one SRS resource identification information for at least one DL beam transmitted to the UE, wherein the SRS resource identification information is associated with at least one antenna-port of the UE receiving the corresponding DL beam.

According to another aspect of embodiments herein, there is also provided UE for providing antenna port related information to a radio base station, the UE comprising a processor and a memory, said memory containing instructions executable by said processor whereby said UE is operative to perform any one of the subject-matter of method claims 1-9.

According to another aspect of embodiments herein, there is also provided a radio base station or gNB, for acquiring antenna port related information from a UE, the radio base station comprising a processor and a memory, said memory containing instructions executable by said processor whereby said radio base station is operative to configure one or more SRS resource set(s) for a user equipment (UE) with each SRS resource set comprising a group of SRS resources; and receive at least one Sounding Reference Signal (SRS) resource identification information (SRS-ResourceSetId or SRS-ResourceId) during a beam reporting or a channel state information (CSI) reporting instance from the UE.

There is also provided a computer program comprising instructions which when executed on at least one processor of the UE, cause the at least said one processor to carry out any of the methods disclosed herein.

A carrier is also provided containing the computer program wherein the carrier is one of a computer readable storage medium; an electronic signal, optical signal or a radio signal.

There is also provided a computer program comprising instructions which when executed on at least one processor of the radio base station, cause the at least said one processor to carry out any of the methods disclosed herein.

A carrier is also provided containing the computer program, wherein the carrier is one of a computer readable storage medium; an electronic signal, optical signal or a radio signal.

An advantage with embodiments herein, from a UE energy consumption perspective is to synchronize the panel(s)/port(s) information between the UE and the radio base station in the DL and the UL thereby helping the network to control the UE's power consumption.

Another advantage with embodiments herein is to enable the radio base station take into account the UE's ability to exploit reciprocity between DL and UL transmission. By sharing the reception or panel information in the DL, the UE aids the radio base station to setup UE's UL Tx beams; thereby reducing the latency of the UL link establishment and adaptation.

Yet another advantage with providing panel-specific or port-specific information or information on the antenna ports receiving the reported CSI-RS using SRS resource/set ID values, is to enable the radio base station to configure appropriate SRS resources or resource set from specific panel(s)/port(s) for UL transmission thereby reducing the latency of link establishment/adaptation in the UL and the resources used for UL channel sounding.

Further, feedback overhead in beam reporting is reduced or avoided since no explicit signaling of the antenna port related information is transmitted to the radio base station.

BRIEF DESCRIPTION OF THE DRAWINGS

Examples of embodiments and advantages of the embodiments herein are described in more detail with reference to attached drawings in which.

DETAILED DESCRIPTION

Figure 1:
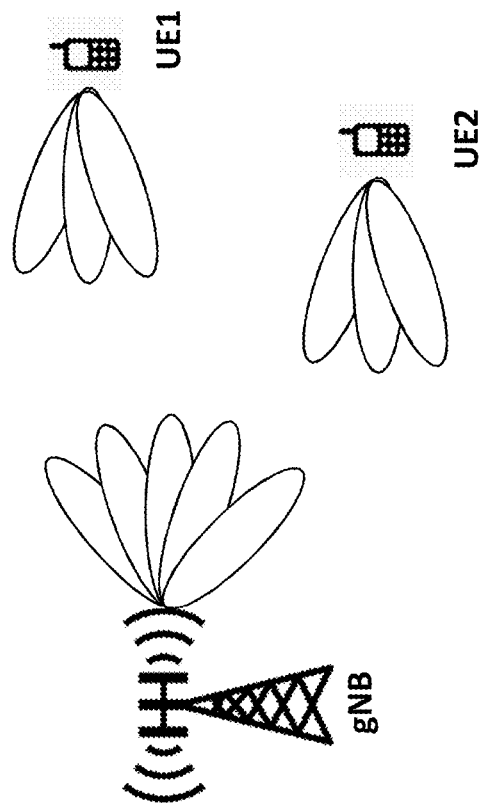
FIG. 1 depicts a network scenario wherein link establishment and adaptation may be performed using beam-formed reference signals.
Figure 2:
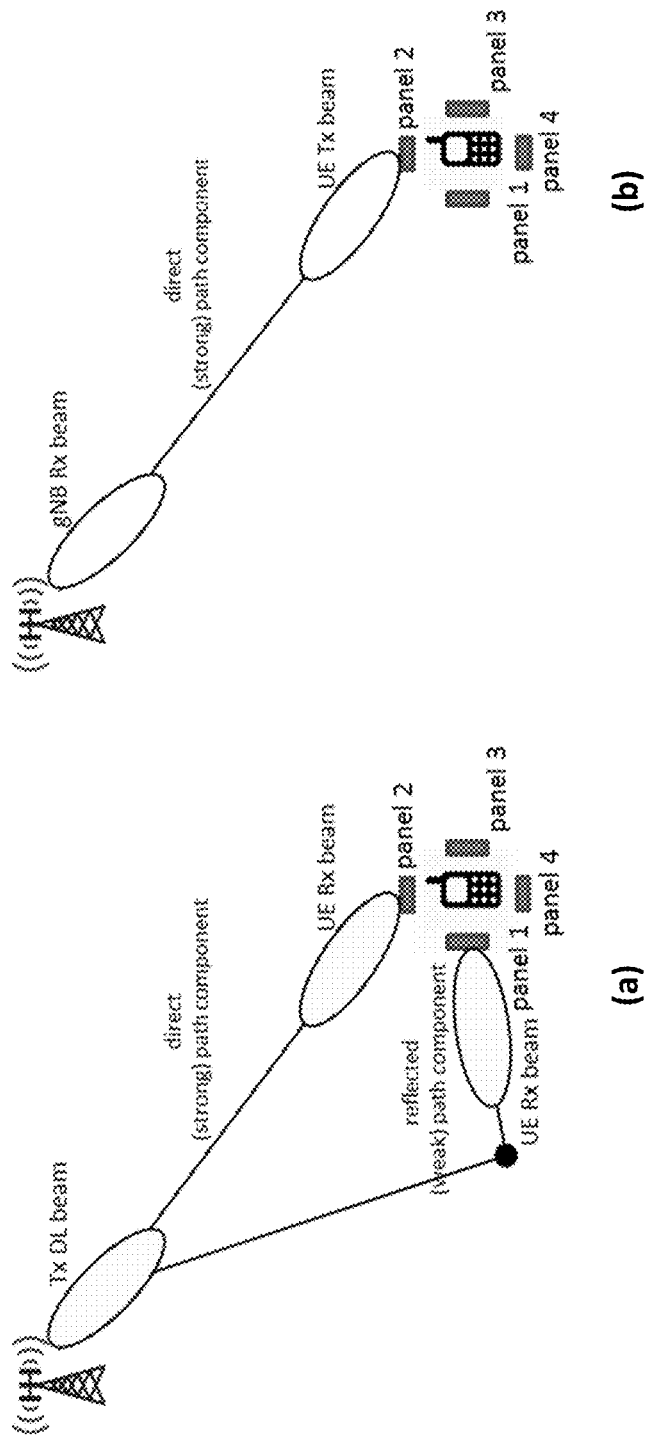
FIG. 2 depicts in (a) Reception of a DL Tx beam sent by the gNB using two panels at the UE, and in (b) Corresponding uplink transmission on the strong path component using a single panel at the UE.
Figure 3:
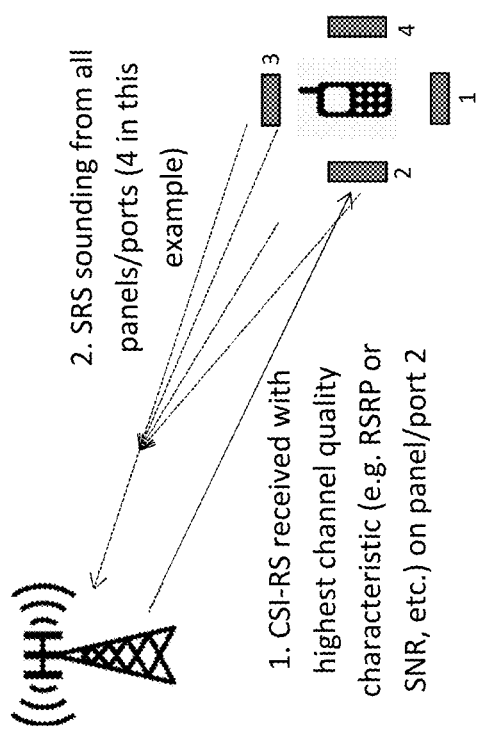
FIG. 3 illustrates an example of a lack of DL signal reception information at the UE which delays link adaptation in the UL.

In the following, a detailed description of the exemplary embodiments is described in conjunction with the drawings, in several scenarios to enable easier understanding of the solution(s) described herein.

It should be emphasized that a panel discussed throughout this disclosure may be associated with at least one antenna port. Below are some examples demonstrating that basically a panel may be associated with more than an antenna port, for example a set of antenna ports. A panel may be associated with any number of antenna ports, 1, 2, 3, 4, . . . , 64, etc. and the embodiments herein are not restricted to any particular number of antenna ports associated with a panel. Generally, the number of antenna ports is a design parameter depending on cost, size, complexity of a UE with such a panel or antenna ports.

Possible example configuration of SRS sets/SRS resources in relation to panel(s) or antenna port(s): below is an example wherein two panels are considered:

a) A UE may be equipped with two panels and each panel may be associated with or may use 1 UE antenna port to form a single transmit beam/receive beam at one time instant. As such, there will be 2 SRS sets and each SRS set will include one or more SRS resources, where each SRS resource contains a single SRS port.

b) The UE may be equipped with two panels and each panel may be associated with or may use 2 UE antenna ports to form/receive a single beam at one time instant. As such, there will be 2 SRS sets and each SRS set will include one or more SRS resources, where each SRS resource contains two SRS ports.

c) The UE may be equipped with two panels and each panel may be associated with or may use 2 UE antenna ports to form two beams at one time instant. As such, there will be 4 SRS sets and each SRS set will include one or more SRS resources, where each SRS resource contains a single SRS port.

d) The UE may be equipped with two panels and each panel may be associated with or may use 4 UE antenna ports to form two beams at one time instant. As such, there will be 4 SRS sets and each SRS set will include one or more SRS resources, where each SRS resource contains two SRS ports.

In general, the embodiments herein relate to a method performed by a UE and a UE for providing antenna port related information to a radio base station. The embodiments also relate to a method performed by a radio base station and a radio base station for acquiring antenna-port related information of a UE about signal reception at the UE. Benefits of providing and/or acquiring such information were listed above and will be described more in this detailed description.

The method performed by the UE includes: receiving at least one DL beam from the radio base station or gNB; and reporting at least one Sounding Reference Signal (SRS) resource identification information for said at least one received DL beam, wherein the SRS resource identification information is associated with at least one antenna port of the UE receiving the corresponding DL beam. The SRS resource identification information may be an SRS resource ID and/or an SRS resource set ID depending on the desired case and/or implementation.

Configuration of at Least One SRS Resource/SRS Resource Set

The UE panels or antenna ports are generally kept transparent to the network and no definition of a UE panel is provided in the Rel.-15 specifications. However, in the specific case when the higher layer parameter usage in SRS-Config is set to beamManagement, an SRS resource set can be understood to be associated with a UE panel. In [1] (TS 38.214, 6.2.1), it is stated that:

"When the higher layer parameter usage is set to beamManagement, only one SRS resource in each of multiple SRS sets can be transmitted at a given time instant. The SRS resources in different SRS resource sets can be transmitted simultaneously."

Therefore, it can be argued or interpreted that different SRS resources (i.e., different UE UL Tx beams) of the same SRS resource set may correspond to the same panel or the same antenna port. However, such a definition is not provided in the Rel-15 specifications. This means, when a UE is equipped with, for example, S antenna panels/ports for transmission and reception, each of the configured S SRS resource sets is associated with a single UE panel/port as shown in FIG. 4(a). Moreover, each SRS resource set comprises one or more SRS resources, where an SRS resource of the s-th SRS resource set is associated with an UL Tx beam from the s-th UE panel/port. S can take any value and the embodiments herein are not restricted to any particular number of antenna ports or panels.

In another example as shown in FIG. 4(b), an SRS resource set may correspond to a subset of all possible beams from a panel/antenna port. Four subsets are shown in FIG. 4(b) denoted SRS resource set 1, 2, 3 and 4.

According to an exemplary embodiment herein denoted Solution 1, for every reported beam in the downlink (DL) CSI report, the UE makes a recommendation of an SRS resource identification information such as the ID of an SRS resource set(s) (denoted herein SRS-ResourceSetId) that the gNB may use to sound in the uplink to identify a suitable UL Tx beam. The UE may decide the recommended SRS-ResourceSetId value(s) based on the panel/antenna ports receiving the DL beam that the UE transmits the SRS resource sets from and the channel quality characteristics of the received beams e.g. a RSRP, a SNR, throughput, SINR, etc. Note that a lowest BER or BLER may be used as channel quality characteristic. This embodiment provides the gNB with the suggestion on a panel (or antenna port) or a group of beams that can be sounded to determine the UL Tx beam.

Figure 4:
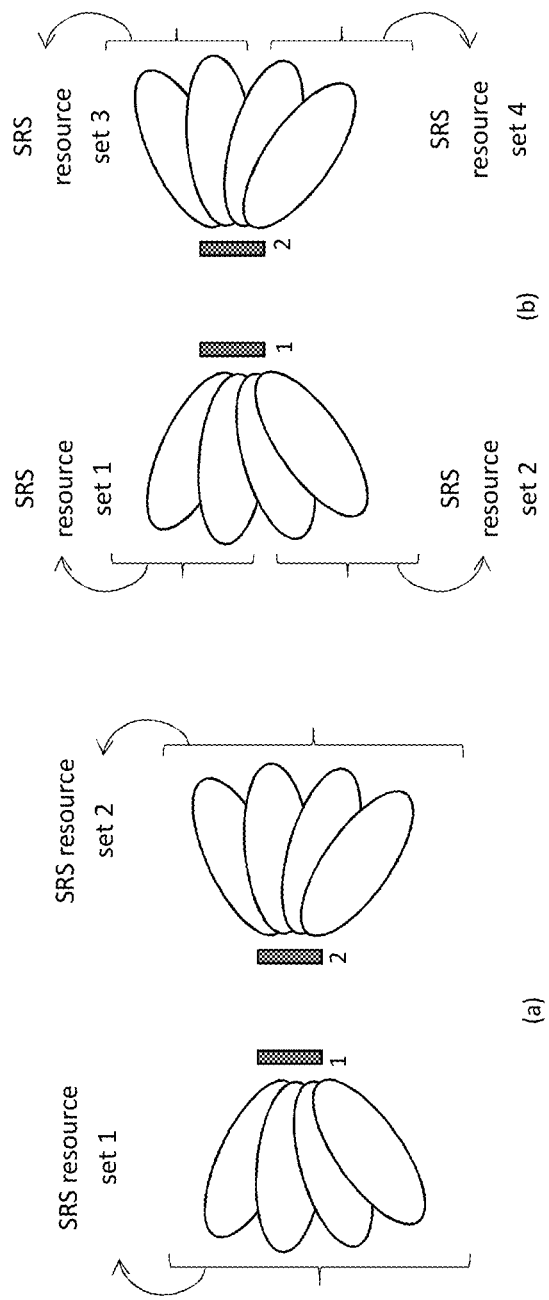
FIG. 4 illustrates example of SRS resource set allocation for UEs with multiple panels/ports according to some embodiments herein.

In case the SRS resource sets are allocated to panels or antenna ports as shown in FIG. 4 (a), the reported SRS resource identification information e.g. the SRS-ResourceSetId value(s) may correspond to panels or antenna ports at the UE. If multiple panels/ports receive the DL beam, the SRS-ResourceSetId value reported may correspond to the panel receiving the DL beam with the highest channel quality characteristic e.g. highest RSRP, SNR, SINR etc., lowest BER, BLER etc. The gNB can thus use the antenna port related information in UL sounding and spatialRelationInfo configuration to have control over which panels/antenna ports at the UE that may be used for transmission and which ones to switch off.

Hence, according to an embodiment, the method performed by the UE includes reporting the SRS resource identification information corresponding to the antenna port receiving the DL beam having a highest channel quality characteristic, if multiple antenna ports of the UE receive said at least one DL beam.

According to an embodiment, the reporting of said at least one SRS resource identification information, the SRS-ResourceSetId or SRS-ResourceId, is performed during a CSI-reporting or beam reporting instance.

According to an embodiment denoted here Solution 2, during the CSI/beam report on the received DL beams, the UE is configured to indicate a suitable SRS resource identification information (e.g. a SRS-ResourceId, i.e., an UL Tx beam) that can be used for the corresponding UL transmission together with at least the CRI/SSBRI. In addition to the CRI/SSBRI, other CSI quantities may be reported. The UE decision may be based on the SRS resource using the same antenna port(s) as the one(s) receiving the reported DL resource (RS). The reported SRS identification information (SRS resource ID) may be viewed as a recommendation to the gNB to configure the higher-layer parameter associatedCSI-RS or spatialRelationInfo (to associate the SRS resource and the corresponding CSI-RS/SSB resource).

According to an embodiment, the reporting of said at least one SRS resource identification information is triggered by the radio base station or gNB by configuring a higher-layer parameter, CSI-ReportConfig, indicating at least a list of CSI quantities, ReportQuantity, the UE is requested to report to the gNB.

The solutions described above have a stark difference from the methods that introduce panel identifiers or port-group identifiers to be shared as UE reception information in the CSI report (discussed in recent 3GPP proceedings as described above). In those methods, the UE and the gNB share the information on the specific ports the UE uses for the transmission of specific SRS resources or resource sets, i.e., each port or a group of ports at the UE is identified with a unique ID and hence the gNB knows which ports the UE is using for transmission of specific SRS resources/resource sets.

In the proposed solutions, however, the UE may be configured to determine the mapping of the SRS resources/resource sets to its antenna ports and the ports to which the SRS resources/resource sets are mapped to at the UE is kept transparent from the gNB.

For example, a UE equipped with 4 antenna array panels and configured with 2 SRS resource sets, may be configured to map the SRS resource sets to 2 of the 4 panels. In the methods that use UE panel or port group IDs, the SRS resource sets are mapped to antenna ports that belong to the panel(s) indicated by the panel/port group ID(s) provided by the gNB via higher layer configuration. When there are no identifiers for UE antenna ports or panels, the UE decides the mapping of the SRS resources/resource sets to the antenna ports and the gNB is unaware of the ports the SRS resources/sets are mapped to. The mapping may change in different instances and the gNB is unaware of the changes in the mapping as well. In the given example, at time instance $t_1$, the $1^{st}$ SRS resource set may be mapped to panel 1 and at time instance $t_2$, the $1^{st}$ SRS resource set may be mapped to panel 2. In the proposed solution 1, the UE may report the SRS resource set ID that is mapped to the panel(s)/antenna port(s) the UE is receiving in the DL. The gNB is unaware of which panels/ports the UE is using but it receives a recommendation (SRS resource set ID values) for scheduling UL transmissions, which is the information required at the gNB. Thus, the UE's privacy with respect to antenna port mappings is maintained in the proposed solutions unlike the methods providing panel ID/port group ID values.

Proposals to configure and structure UE reporting of the SRS identification information, SRS-ResourceSetId or SRS-ResourceId.

The above-described solutions help the gNB in efficiently deciding which SRS resources to configure/schedule for uplink channel sounding. To configure the UE to transmit SRS resource identification information such as SRS-ResourceSetId or SRS-ResourceId values as stated in the above solutions or to efficiently structure the UE's reporting, further proposals are provided:

1) Configuring Beam Reception Information as a CSI Reporting Quantity for the UE For CSI reporting from the received DL beams/reference signals, the gNB configures the UE with the higher-layer parameter CSI-ReportConfig. The reporting of at least one SRS resource identification information is configured via a higher-layer parameter. If multiple DL beams are received by the UE, the UE is configured to report a single SRS resource identification information for said received plural DL beams.

Before discussing the implementation of the proposed solutions by modifying the CSI reporting quantity, a brief account of the higher-layer parameter ReportQuantity in CSI-ReportConfig is provided. The list of CSI quantities the UE may report are provided in ReportQuantity. It includes a subset of the following CSI quantities for the UE to report:

cri: CSI-RS resource Indicator
ssb-Index: Synchronization Signal Block index
RI: Rank Indicator
PMI: Precoder Matrix Indicator
CQI: Channel Quality Indicator
i1: Wideband PMI
RSRP: Reference Signal Received Power
LI: Layer Indicator For example, if ReportQuantity is set to the value the UE is configured to report the received CSI-RS resource indicator, Rank Indicator, wideband Precoding Matrix Indicator (PMI) and the Channel Quality Indicator (CQI). Each CSI quantity in the list is conditioned on all the quantities before it in the list, i.e., the RI is conditioned on the CRI, the wideband PMI i1 is conditioned on the RI and the CRI evaluated, and the CQI is conditioned on the evaluated CRI, RI and the wideband PMI i1.

To implement solution 1 described before, the following new options are added to values of the higher-layer parameter Report Quantity:

cri-srsRsid-RI-PMI-CQI
cri-srsRsid-RI-i1
cri-srsRsid-RI-i1-CQI
cri-srsRsid-RI-CQI
cri-srsRsid-RSRP
ssb-Index-srsRsid-RSRP
cri-srsRsid-RI-LI-PMI-CQI If the UE receives the higher-layer parameter ReportQuantitythat includes the CSI quantity 'srsRSid', the UE is configured to include in the CSI report, along with the other parameters mentioned in the Report Quantity, an SRS-ResourceSetId from the configured SRS resource sets in the higher layer parameter SRS-Config. The reported SRS resource set ID value may be associated to the UE panel/antenna port or one of the UE panels/antenna ports receiving the DL beam indicated by the reported 'cri' or 'ssb-index'.

To implement solution 2, the gNB is configured to notify the UE to report an SRS identification information (SRS-ResourceId) along with the reported CRI/SSBRI values by configuring the higher-layer parameter ReportQuantity with the following new options:

cri-srsRid-RI-PMI-CQI
cri-srsRid-RI-i1
cri-srsRid-RI-i1-CQI
cri-srsRid-RI-CQI
cri-srsRid-RSRP
ssb-Index-srsRid-RSRP
cri-srsRid-RI-LI-PMI-CQI On reception of the higher-layer parameter ReportQuantity with the CSI quantity 'srsRid', the UE is configured to include in the CSI report, along with the other parameters mentioned in the Report Quantity, an SRS-ResourceId from the SRS resource sets configured in the higher layer parameter SRS-Config. The decision, as mentioned earlier, may be based on the SRS resource set that the UE has associated with the same antenna ports as the ones receiving the reported DL RS.

When multiple UE panels receive the DL beam, the SRS-ResourceSetId reported may be associated with the panel receiving the DL beam with the highest RSRP/SNR/SINR/etc.

2) Configuring UE Beam Reception Information with an 'Enable/Disable' Bit

According to an embodiment, the gNB includes a new enable/disable bit or parameter denoted by the name srsReception-SRS-RId or srsReception-SRS-RId, for example, via a higher layer to indicate whether the SRS resource identification information is to be included along with a CSI/beam reporting or not.

In other words, the beam reception information may be included as optional information to the CSI report configured using the settings in CSI-ReportConfig. The new enable/disable bit or parameter configured via a higher layer indicates whether the SRS-ResourceSetId or SRS-ResourceId must be reported by the UE along with the beam/CSI report.

An an example, if the higher-layer parameter srsReceptionInfo-SRS-RsId in e.g. CSI-ReportConfig is set to 'true' or 1", then the UE includes in the CSI/beam report, an SRS-ResourceSetId from the ones configured in the higher layer parameter SRS-Config. The reported SRS resource set ID may be associated with the panel receiving the DL beam indicated by the reported 'cri' or 'ssb-index'. When multiple UE panels receive the DL beam, the SRS-ResourceSetId reported may be associated with the panel receiving the DL beam with the highest RSRP/RSRQ/SNR/SINR/etc.

In another example, if the higher-layer parameter srsReceptionInfo-SRS-RId in e.g. CSI-ReportConfig is set to 'true' or "1", the UE indicates the suitable SRS resource (an SRS-ResourceId) that can be used in the uplink. The decision may be based on the SRS resource using the same ports as the spatial filter receiving the reported DL RS and the RSRP/RSRQ/SNR/SINR/etc. at the receiving ports.

The SRS resource identification information, SRS-ResourceSetId or the SRS-ResourceId value(s), is/are reported along with each of the reported CRI/SSBRI values in the uplink control information carrying the corresponding CSI.

According to an embodiment, proposals 1 and 2 can be extended by configuring the number of SRS-ResourceId or SRS-ResourceSetId values reported in case of tri-RSRP' and 'ssb-Index-RSRP' reporting. This extension is applicable when the higher-layer parameter groupBasedBeamReporting is disabled and the higher-layer parameter ReportQuantity is set to tri-RSRP' or 'ssb-Index-RSRP'.

According to an embodiment in relation to Solution 1, the number of SRS-ResourceSetId values to be reported by the UE in the case of DL beam reporting can be configured by adding a higher-layer parameter nrOfReportedSRSsId. The SRS resource identification information corresponds to SRS-ResourceSetId.

When the value of nrOfReportedSRSsId is set to n, the beam report may look as follows:

cri/ssb-Index #1, RSRP #1, SRS-ResourceSetId #1
cri/ssb-Index #2, RSRP #2, SRS-ResourceSetId #2
. . .
cri/ssb-Index #n, RSRP #n, SRS-ResourceSetId #n
cri/ssb-Index #n+1, RSRP #n+1
. . .

According to an embodiment in relation to Solution 2, the number of SRS-ResourceId values to be reported by the UE in the case of DL beam reporting can be configured by adding a higher-layer parameter nrOfReportedSRSId. The SRS resource identification information in this case corresponds to SRS-ResoucetId.

When the value of nrOfReportedSRSId is set to n, the beam report may look as follows:

cri/ssb-Index #1, RSRP #1, SRS-ResourceId #1
cri/ssb-Index #2, RSRP #2, SRS-ResourceId #2
. . .
cri/ssb-Index #n, RSRP #n, SRS-ResourceId #n
cri/ssb-Index #n+1, RSRP #n+1
. . .

Note: In the examples for both solutions, the higher-layer parameter nrofReportedRS is assumed to be greater than n. If nrofReportedRS is less than or equal to n, then an SRS-ResourceSetId or an SRS-ResourceId value is reported for every reported cri/ssb-Index. The parameter n may take any suitable value and is a design parameter.

Proposal 3. According to another proposal, the following extension to group-based SRS-ResourceSetId or SRS-ResourceId report in DL beam reports is provided:

Solution 1 above provides panel-specific or antenna port related information to the gNB for UL data transmission. For DL beam reporting, N out of K DL beams reported may be associated with the same panel/antenna port (i.e., the same srsRsId). N and K are design parameters and any suitable values may be used.

In order to reduce the feedback overhead, the DL beams (CRI/SSBRI values) reported may be grouped with respect to the srsRsId they are associated with. This means, instead of reporting for the N DL beams (which are associated with the same srsRsId) N times the same srsRsId, only a single srsRsId is reported for those DL beams. If multiple received DL beams (CRI/SSBRI values) have a common srsRsId, the DL beams (cri's or ssb-indices) may be grouped in the report as follows:

srsRsId #1:
   cri/ssb-Index #1, Reporting Quantity #1 (e.g., RSRP, SNR, SINR, BER, BLER, etc.)
   cri/ssb-Index #2, Reporting Quantity #2 (e.g., RSRP, SNR, SINR, BER, BLER etc.)
   . . .

srsRsId #2:
   cri/ssb-Index #N, Reporting Quantity #N (e.g., RSRP, SNR, SINR, BER, etc.)
   cri/ssb-Index #N+1, Reporting Quantity #N+1 (e.g., RSRP, SNR, SINR, BER, BLER etc.)
   . . .

Solution 2 presented earlier further provides beam-specific information to the gNB for UL data transmission. For DL beam reporting, N out of K DL beams reported may be associated with the same UE Tx beam (i.e., the same srsRId). In order to reduce the feedback overhead, the DL beams (CRI/SSBRI values) reported may be grouped with respect to the srsRId they are associated with. This means, instead of reporting for the N DL beams (which are associated with the same srsRId) N times the same srsRId, only a single srsRId is reported for those DL beams. If a number of received DL beams (CRI/SSBRI values) have a common srsRId, the DL beams (cri's or ssb-indices) may be grouped in the report as follows:

srsRId #1:
   cri/ssb-Index #1, Reporting Quantity #1 (e.g., RSRP, SNR, SINR, BER, BLER, etc.)
   cri/ssb-Index #2, Reporting Quantity #2 (e.g., RSRP, SNR, SINR, BER, BLER, etc.)
   . . .

srsRId #2:
   cri/ssb-Index #N, Reporting Quantity #N (e.g., RSRP, SNR, SINR, BER, BLER, etc.)
   cri/ssb-Index #N+1, Reporting Quantity #N+1 (e.g., RSRP, SNR, SINR, BER, BLER, etc.)
   . . .

According to another proposal, the UE reports multiple SRS-ResourceSetId or SRS-ResourceId values for each beam or a group of beams.

The UE may recommend more than one SRS-ResourceSetId or SRS-ResourceId values for each beam or a set of beams. This would mean that a CSI-RS or SSB resource may be received by multiple panels/beams/antenna ports and the UE recommendation of multiple SRS resources/resource sets may be used for multi-beam and multi-panel UL transmissions.

The SRS resource identification information, SRS-ResourceSetId or SRS-ResourceId values, may be reported for each and every cri/ssb-Index value reported, or the DL beam report may be grouped if multiple DL beams have the same SRS resource/resource set recommendation.

An example of the DL beam report when two SRS resources or resource sets are recommended for each reported CRI/SSB-Index:

For solution 1:
   cri/ssb-Index #1, Reporting Quantity #1 (e.g., RSRP), srsRsId #1.1, srsRsId #1.2
   . . .
   cri/ssb-Index #2, Reporting Quantity #N (e.g., RSRP), srsRsId #N.1, srsRsId #N.2

For solution 2:
   cri/ssb-Index #1, Reporting Quantity #1 (e.g., RSRP), srsRId #1.1, srsRId #1.2
   . . .
   cri/ssb-Index #2, Reporting Quantity #N (e.g., RSRP), srsRId #N.1, srsRId #N.2

An example of the DL beam report when two SRS resources or resource sets are recommended for the set of all reported CRI/SSB-Index values:

For solution 1:
srsRsId #1:
   cri/ssb-Index #1, Reporting Quantity #1 (e.g., RSRP, SNR, SINR, BER, BLER etc.)
   . . .
   cri/ssb-Index #2, Reporting Quantity #N1 (e.g., RSRP, SNR, SINR, BER, BLER, etc.)
srsRsId #2:
   cri/ssb-Index #N1+1, Reporting Quantity #N1+1 (e.g., RSRP)
   . . .
   cri/ssb-Index #N1+N2, Reporting Quantity #N1+N2 (e.g., RSRP, SNR, SINR, BER, BLER, etc.)

For solution 2:
srsRId #1:
   cri/ssb-Index #1, Reporting Quantity #1 (e.g., RSRP)
   . . .
   cri/ssb-Index #2, Reporting Quantity #N1 (e.g., RSRP, SNR, SINR, BER, etc.)
srsRId #2:
   cri/ssb-Index #N1+1, Reporting Quantity #N1+1 (e.g., RSRP)
   . . .
   cri/ssb-Index #N1+N2, Reporting Quantity #N1+N2 (e.g., RSRP, SNR, SINR, BER, BLER, etc.)

Figure 5:
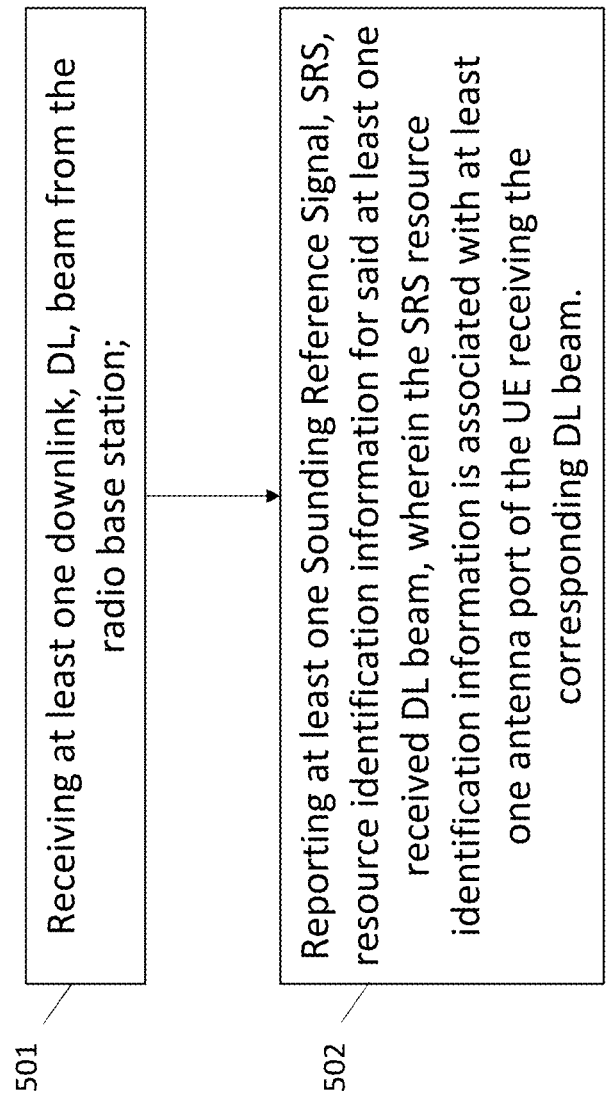
FIG. 5 illustrates a flowchart of a method performed by a UE according to some exemplary embodiments herein.

Referring to FIG. 5, there is illustrated a flowchart of a method performed by a UE according to previously described embodiments for providing antenna port or panel related information to a radio base station (or gNB), about signal reception at the UE, the method comprising:

(501) receiving at least one downlink, DL, beam from the radio base station; and (502) reporting at least one Sounding Reference Signal, SRS, resource identification information for said at least one received DL beam, wherein the reported SRS resource identification information is associated with at least one antenna port of the UE receiving the corresponding DL beam.

As previously described, if multiple antenna ports of the UE receive said at least one DL beam, the method comprises reporting the SRS resource identification information corresponding to the antenna port receiving the DL beam having a highest channel quality characteristic (RSRP, SNR, SINR, (lowest BER, BLER (BLock Error Rate), etc.) The embodiments herein are not restricted to any particular channel quality characteristic. As previously described, the reporting of said at least one SRS resource identification information is performed during a CSI reporting or beam reporting instance. According to another embodiment, the reporting of the SRS resource identification information used by the UE for UL transmission is performed together with at least a CRI/SSBRI and wherein the SRS resource identification information corresponds to the SRS resource or SRS resource set using the same antenna port(s) as the one(s) receiving a reporting DL resource or the same antenna ports used for receiving a DL reference signal (RS) that is reported by the UE.

As previously presented, the reporting of said at least one SRS resource identification information may be triggered by the radio base station by configuring a higher-layer parameter, CSI-ReportConfig, indicating at least a list of CSI quantities, ReportQuantity, the UE is requested to report to the radio base station.

The reporting may also be triggered using an enable/disable bit or parameter, rsReceptionInfo-SRS-RsId, configured via a higher layer, to indicate whether the SRS resource identification information is to be included or not along with a CSI/beam reporting. The CSI-ReportConfig may include the enable/disable bit or parameter.

Further, if plural DL beams are received by the UE, a single SRS resource identification information for said received plural DL beams may be reported.

According to an embodiment, the UE may report multiple SRS resource identification information for each received DL beam or for each received group of DL beams.

Figure 6:
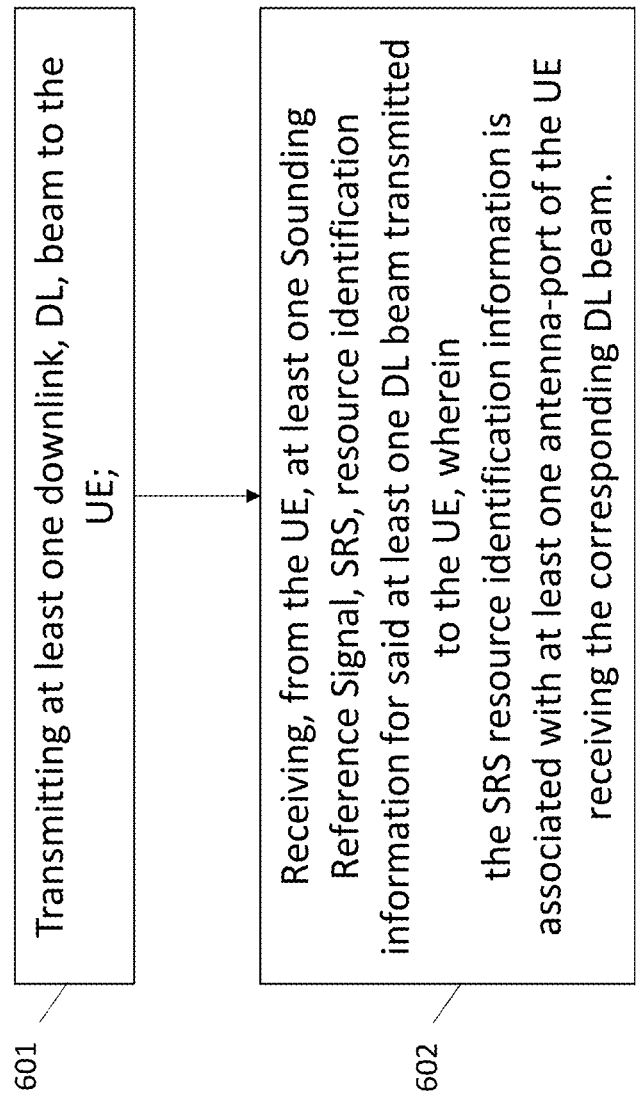
FIG. 6 illustrates a flowchart of a method performed by a radio base station according to some exemplary embodiments herein.

Referring to FIG. 6, a flowchart of a method performed by a radio base station or gNB for acquiring antenna port related information or panel related information of a UE about signal reception at the UE. The main steps include:

(601) transmitting at least one downlink, DL, beam to the UE; and (602) receiving, from the UE, at least one Sounding Reference Signal, SRS, resource identification information for said at least one DL beam transmitted to the UE, wherein the SRS resource identification information is associated with at least one antenna-port of the UE receiving the corresponding DL beam.

According to an embodiment, the method further comprises receiving the SRS resource identification information corresponding to the antenna port used by the UE to receive the DL beam having a highest channel quality characteristic, if multiple antenna ports of the UE receive said at least one DL beam. The method further comprises receiving said at least one SRS resource identification information during a CSI reporting or beam reporting instance.

According to an embodiment, the method comprises receiving the SRS resource identification information used by the UE for UL transmission together with at least one CRI/SSBRI. As previously disclosed, the reporting of said at least one SRS resource identification information may be triggered by configuring the UE with a higher-layer parameter CSI-ReportConfig, indicating at least a list of CSI quantities, ReportQuantity, the UE is requested to report to the radio base station. The UE may be configured via a higher layer with an enable/disable bit or parameter, rsReceptionInfo-SRS-RsId, to indicate whether the SRS resource identification information is to be included along with a CSI/beam reporting from the UE or not. The CSI-ReportConfig may include the enable/disable bit or parameter. The method further comprises receiving multiple SRS resource identification information for each transmitted DL beam and received by the UE or for each transmitted group of DL beams and received by the UE. In addition, a single SRS resource identification information may be transmitted or reported for plural DL beams, if plural DL beams are transmitted to the UE and received by the UE.

Figure 7:
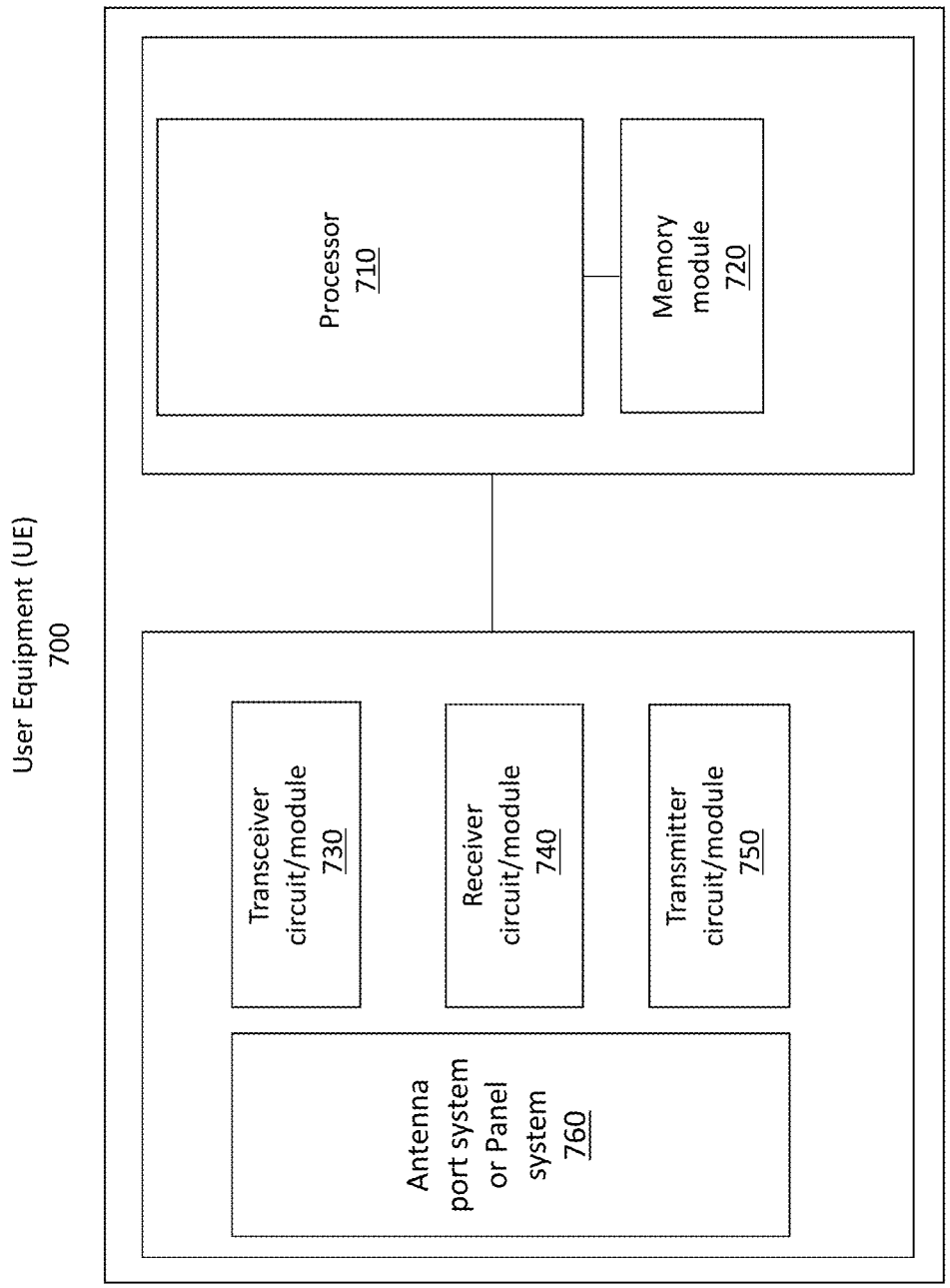
FIG. 7 is a block diagram depicting a UE according to exemplary embodiments herein.

In order to perform the previously described process or method steps related to a UE, some embodiments herein include a UE for providing antenna port related information to a radio base station (or gNB). As shown in FIG. 7, the UE 700 comprises a processor 710 or processing circuit or a processing module or a processor or means 710; a receiver circuit or receiver module 740; a transmitter circuit or transmitter module 750; a memory module 720 a transceiver circuit or transceiver module 730 which may include the transmitter circuit 750 and the receiver circuit 740. The UE 700 further comprises an antenna port system or panel system 760 which includes antenna circuitry and/or ports for transmitting and receiving signals to/from at least the radio base station;

The UE 700 may be a wireless device, a wireless terminal, a mobile station, a mobile telephone, a mobile terminal, a cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, just to mention some examples.

The processing module/circuit 710 includes a processor, microprocessor, an application specific integrated circuit (ASIC), field programmable gate array (FPGA), or the like, and may be referred to as the "processor 710." The processor 710 controls the operation of the UE 700 and its components. Memory (circuit or module) 720 includes a random-access memory (RAM), a read only memory (ROM), and/or another type of memory to store data and instructions that may be used by processor 710. In general, it will be understood that the UE 700 in one or more embodiments includes fixed or programmed circuitry that is configured to carry out the operations in any of the embodiments disclosed herein.

In at least one such example, the UE 700 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out any the UE operations disclosed herein.

Further, it will be appreciated that the UE 700 may comprise additional components not shown in FIG. 7.

As previously presented, the UE 700 is operative to receive at least one DL beam from the radio base station; and report at least one SRS resource identification information for said at least one received DL beam, wherein the SRS resource identification information may be associated with at least one antenna port of the UE receiving the corresponding DL beam.

The UE 700 is operative to report the SRS resource identification information corresponding to the antenna port receiving the DL beam having a highest channel quality characteristic, if one or more antenna ports of the UE receive said at least one DL beam.

The UE 700 is operative to report said at least one SRS resource identification information during a CSI reporting or beam reporting instance.

The UE 700 is further operative to report the SRS resource identification information used by the UE for UL transmission together with at least a CRI/SSBRI, wherein SRS resource identification information may correspond to the SRS resource using the same antenna port(s) as the one(s) receiving a reporting DL resource or DL reference signal. The UE 700 is further configured to be triggered by the gNB to report said at least one SRS resource identification information by configuring a triggering higher-layer parameter (in e.g. CSI-ReportConfig), indicating at least a list of CSI quantities, Report Quantity, the UE 700 is requested to report to the radio base station. According to an embodiment, UE is configured to receive a higher layer parameter, rsReceptionInfo-SRS-RsId, that enables/disables the reporting of the SRS resource identification information along with a CSI/beam reporting.

If plural DL beams are received by the UE 700, the UE 700 is configured to report a single SRS resource identification information for said received plural DL beams. The UE 700 is further configured to report multiple SRS resource identification information for each received DL beam or for each received group of DL beams.

Additional details relating to the functionality or actions performed by the UE have already been disclosed.

There is also provided a computer program comprising instructions which when executed on at least one processor 710 of the UE 700, cause the processor 710 to carry out any of the methods disclosed herein.

A carrier containing the computer program is provided wherein the carrier is one of a computer readable storage medium; an electronic signal, optical signal or a radio signal.

Figure 8:
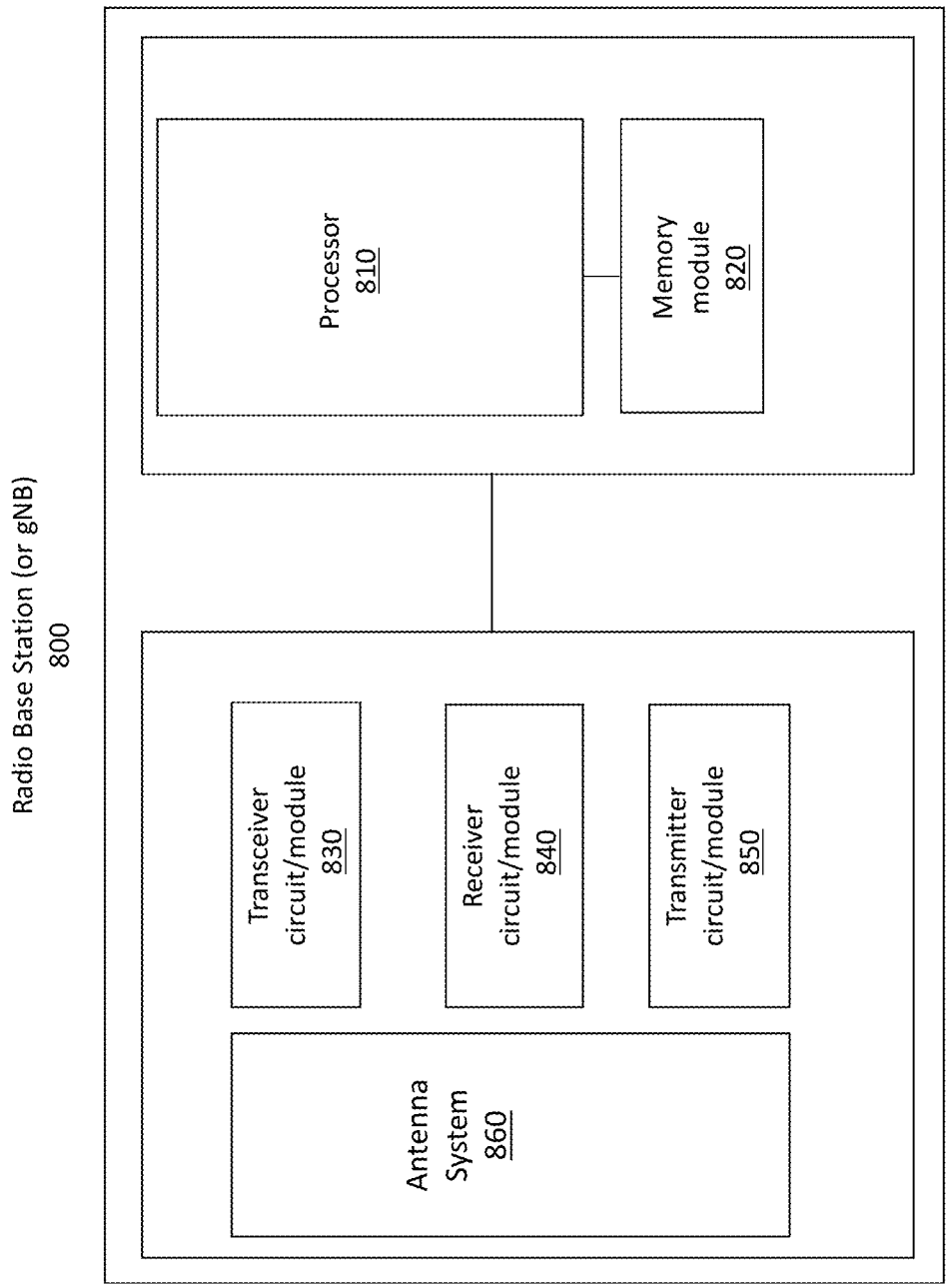
FIG. 8 is a block diagram depicting a radio base station according to exemplary embodiments herein.

In order to perform the previously described process or method steps related to the radio base station, some embodiments herein include a radio base station for acquiring antenna port related information. As shown in FIG. 8, the radio base station 800 comprises a processor 810 or processing circuit or a processing module or a processor or means 810; a receiver circuit or receiver module 840; a transmitter circuit or transmitter module 850; a memory module 820 a transceiver circuit or transceiver module 830 which may include the transmitter circuit 850 and the receiver circuit 840. The radio base station 800 further comprises an antenna system 860 which includes antenna circuitry for transmitting and receiving signals to/from at least the UE 700;

The radio base station 800 may belong to any radio access technology including 2G, 3G, 4G or LTE, LTE-A, 5G, WLAN, and WiMax etc. that support beamforming technology.

The processing module/circuit 810 includes a processor, microprocessor, an application specific integrated circuit (ASIC), field programmable gate array (FPGA), or the like, and may be referred to as the "processor 810." The processor 810 controls the operation of the UE 800 and its components. Memory (circuit or module) 820 includes a random-access memory (RAM), a read only memory (ROM), and/or another type of memory to store data and instructions that may be used by processor 810. In general, it will be understood that the radio base station 800 in one or more embodiments includes fixed or programmed circuitry that is configured to carry out the operations in any of the embodiments disclosed herein.

In at least one such example, the radio base station 800 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out any of the operations disclosed herein. Further, it will be appreciated that the radio base station 800 may comprise additional components not shown in FIG. 8.

As previously presented, the radio base station 800 is operative to transmit at least one DL beam to the UE; and receive, from the UE, at least one SRS resource identification information for said at least one DL beam transmitted to the UE, wherein the SRS resource identification information is associated with at least one antenna-port of the UE receiving the corresponding DL beam.

The radio base station 800 is operative to receive the SRS resource identification information corresponding to the antenna port used by the UE to receive the DL beam having a highest channel quality characteristic, if one or more antenna ports of the UE receive said at least one DL beam. Examples of channel quality characteristics have already been described.

The radio base station 800 is operative to receive said at least one SRS resource identification information during a CSI reporting or beam reporting instance. The radio base station 800 is operative to receive the SRS resource identification information used by the UE for UL transmission together with at least a CRI/SSBRI. The radio base station 800 is further operative to trigger the reporting of said at least one SRS resource identification information by configuring the UE with a higher-layer parameter, CSI-ReportConfig, indicating at least a list of CSI quantities, ReportQuantity, the UE is requested to report to the radio base station. The CSI-ReportConfig includes an enable/disable bit, rsReceptionInfo-SRS-RsId, to indicate that the SRS resource identification information is to be included or not along with a CSI/beam reporting from the UE. The radio base station 800 is further operative to transmit a single SRS resource identification information for transmitted plural DL beams, if plural DL beams are transmitted to the UE and received by the UE, and to receive multiple SRS resource identification information for each transmitted DL beam received by the UE or for each transmitted group of DL beams received by the UE.

Additional details relating to the functionality or actions performed by the radio base station have already been disclosed.

There is also provided a computer program comprising instructions which when executed on at least one processor 810 of the radio base station 800, cause the processor 810 to carry out any of the methods disclosed herein.

A carrier containing the computer program is provided wherein the carrier is one of a computer readable storage medium; an electronic signal, optical signal or a radio signal.

The embodiments described in this disclosure achieve several advantages which include:

From a UE energy consumption perspective, it may be advantageous to use only a small number of panels for UL Tx beam transmission. Synchronizing the panel/antenna port information between the UE and the gNB with said knowledge may help the network to control the UE's power consumption.

There is no need to violate UE privacy since no explicit signalling of UE panel related information or antenna port related information is performed using the presented invention. Further, because no explicit signalling of UE panel related information or antenna port related information is performed, feedback overhead in beam reporting is reduced or avoided.

The gNB may consider the UE's ability to exploit reciprocity between DL and UL transmission. By sharing the panel/antenna port information on the DL beam reception, the UE may aid the gNB to setup UE's UL Tx beams by exploiting the DL reception conditions; thereby reducing the latency of the UL link establishment and adaptation. Another advantage with embodiments herein is to enable the radio base station take into account the UE's ability to exploit reciprocity between DL and UL transmission. By sharing the panel information on the DL beam reception, the UE aids the radio base station to setup UE's UL Tx beams; thereby reducing the latency of the UL link establishment and adaptation.

Yet another advantage with providing panel-specific or port-specific information or information on the antenna ports receiving the reported CSI-RS, is to enable the radio base station to configure appropriate SRS resources or resource set from specific panel(s)/port(s) for UL transmission thereby reducing the latency of link establishment/adaptation in the UL and the resources used for UL channel sounding.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc. that may employ beamforming technology.

REFERENCES

[1] 3GPP TS 38.214, "Physical layer procedures for data (Release 15)," 3rd Generation Partnership Project; Technical Specification Group Radio Access Network, Version 15.3.0, September 2018.

[2] 3GPP TS 38.331, "Radio Resource Control (RRC) protocol specification (Release 15)," 3rd Generation Partnership Project; Technical Specification Group Radio Access Network, Version 15.1.0, March 2018.

[3] R1-1811408, "Enhancements on Multi-beam Operation," Nokia/Nokia Shanghai Bell, October 2018.

[4] R1-1810221, "Enhancements on multi-beam operation," ZTE, October 2018.

[5] R1-1810791, "On Beam Management Enhancement," Intel Corporation, October 2018.

The invention claimed is:

1. A method performed by a User Equipment (UE), the method comprising:
receiving a configuration of one or more Sounding Reference Signal (SRS) resource set(s) from a radio base station, gNodeB, with each of the one or more SRS resource sets comprising a group of SRS resources; and
reporting at least one SRS resource identification information (SRS-ResourceSetId or SRS-ResourceId) during a beam reporting or a channel state information (CSI) reporting instance, wherein the at least one SRS resource identification information is determined based on a mapping between an SRS resource or SRS resource set and an antenna port, and wherein the at least one SRS resource identification information corresponds to the SRS resource or SRS resource set using an antenna port(s) that is/are also used for receiving a downlink (DL) reference signal (RS) that is reported by the UE in said beam reporting or CSI reporting instance.

2. The method according to claim 1, further comprising:
receiving at least one downlink (DL) beam from the radio base station; and
reporting at least one SRS resource identification information for said at least one received DL beam, wherein the SRS resource identification information is associated with at least one antenna port of the UE receiving the corresponding DL beam.

3. The method according to claim 1, further comprising reporting the SRS resource identification information corresponding to the antenna port receiving a DL beam having a highest channel quality characteristic, if one or more antenna ports of the UE receives said at least one DL beam.

4. The method according to claim 1, further comprising reporting the SRS resource identification information used by the UE for UL transmission together with at least a Channel State Information Reference Signal resource indicator/Synchronization Signal Block Resource Index (CRI/SSBRI).

5. The method according to claim 1, wherein reporting said at least one SRS resource identification information is triggered by the radio base station by configuring a higher-layer parameter (CSI-ReportConfig) indicating at least a list of CSI quantities (ReportQuantity) the UE is requested to report to the radio base station.

6. The method according to claim 5, further comprising receiving an enable/disable bit or parameter (rsReceptionInfo-SRS-RsId), via a higher layer, to indicate whether the SRS resource identification information is to be included along with a CSI/beam reporting or not.

7. The method according to claim 1, wherein if multiple-DL beams are received by the UE, the UE further reporting a single SRS resource identification information for said received multiple DL beams.

8. The method according to claim 1, further comprising reporting multiple SRS resource identification information for each received DL beam or for each received group of DL beams.

9. A method performed by a radio base station, the method comprising:
configuring one or more SRS resource set(s) for a user equipment (UE) with each of the one or more SRS resource sets comprising a group of SRS resources; and receiving at least one Sounding Reference Signal (SRS) resource identification information (SRS-ResourceSetId or SRS-ResourceId) during a beam reporting or a channel state information (CSI) reporting instance from the UE, wherein the at least one SRS resource identification information is determined based on a mapping between an SRS resource or SRS resource set and an antenna port, and wherein the at least one SRS resource identification information corresponds to the SRS resource or SRS resource set using an antenna port(s) that is/are also used for receiving a downlink (DL) reference signal (RS) that is reported by the UE in said beam reporting or CSI reporting instance.

10. The method according to claim 9, further comprising:
transmitting at least one downlink (DL) beam to the UE; and
receiving a report comprising at least one SRS resource identification information for said at least one received DL beam from the UE, wherein, the SRS resource identification information is associated with at least one antenna port of the UE receiving the corresponding DL beam.

11. The method according to claim 9, further comprising receiving, from the UE, a report comprising an SRS resource identification information corresponding to the antenna port receiving the DL beam having a highest channel quality characteristic, if one or more antenna ports of the UE receive said at least one DL beam.

12. The method according to claim 9 further comprising receiving, from the UE, a report comprising the SRS resource identification information used by the UE for UL transmission together with at least a Channel State Information Reference Signal resource indicator/Synchronization Signal Block Resource Index (CRI/SSBRI).

13. The method according to claim 9, further comprising triggering the reporting of said at least one SRS resource identification information by configuring the UE with a higher-layer parameter (CSI-ReportConfig), indicating at least a list of CSI quantities (ReportQuantity), the UE is requested to report to the radio base station.

14. The method according to claim 13, further comprising configuring an enable/disable bit or parameter (rsReceptionInfo-SRS-RsId) via a higher layer, to indicate whether the SRS resource identification information is to be included along with a CSI/beam reporting from the UE or not.

15. The method according to claim 9, further comprising receiving a single SRS resource identification information from the UE for transmitted plural DL beams, if plural DL beams are transmitted to the UE and received by the UE.

16. The method according to claim 9, further comprising receiving multiple SRS resource identification information for each transmitted DL beam received by the UE or for each transmitted group of DL beams received by the UE.

17. A User Equipment (UE) for providing antenna port related information to a radio base station, the UE comprising a processor and a memory, said memory containing instructions executable by said processor whereby said UE is operative to:
receive a configuration of one or more Sounding Reference Signal (SRS) resource set(s) from a radio base station, gNodeB, with each SRS resource set comprising a group of SRS resources; and
report at least one SRS resource identification information (SRS-ResourceSetId or SRS-ResourceId) during a beam reporting or a channel state information (CSI) reporting instance, wherein the at least one SRS resource identification information is determined based on a mapping between an SRS resource or SRS resource set and an antenna port, and wherein the at least one SRS resource identification information corresponds to the SRS resource or SRS resource set using an antenna port(s) that is/are also used for receiving a downlink (DL) reference signal (RS) that is reported by the UE in said beam reporting or CSI reporting instance.

18. A radio base station, for acquiring antenna-port related information from a UE, the radio base station comprising a processor and a memory, said memory containing instructions executable by said processor whereby said radio base station is operative to:
configure one or more SRS resource set(s) for a user equipment (UE) with each SRS resource set comprising a group of SRS resources; and
receive at least one Sounding Reference Signal (SRS) resource identification information (SRS-ResourceSetId or SRS-ResourceId) during a beam reporting or a channel state information (CSI) reporting instance from the UE, wherein the at least one SRS resource identification information is determined based on a mapping between an SRS resource or SRS resource set and an antenna port, and wherein the at least one SRS resource identification information corresponds to the SRS resource or SRS resource set using an antenna port(s) that is/are also used for receiving a downlink (DL) reference signal (RS) that is reported by the UE in said beam reporting or CSI reporting instance.

* * * * *